United States Patent [19]

Yukitake

[11] Patent Number: 5,227,877
[45] Date of Patent: Jul. 13, 1993

[54] HIGH-EFFICIENT CODING APPARATUS FOR VIDEO SIGNAL

[75] Inventor: Takeshi Yukitake, Yokohama, Japan

[73] Assignee: Matsushita Electric Industrial Co., Ltd., Osaka, Japan

[21] Appl. No.: 718,782

[22] Filed: Jun. 21, 1991

[30] Foreign Application Priority Data

Jul. 9, 1990 [JP] Japan .................................. 2-180827

[51] Int. Cl.$^5$ .......................................... H04N 7/137
[52] U.S. Cl. ...................................... 358/136; 358/135
[58] Field of Search .................... 358/136, 135, 133; 341/100

[56] References Cited

U.S. PATENT DOCUMENTS

| 4,125,861 | 11/1978 | Mounts et al. | |
| 4,636,856 | 1/1987 | Starck | 358/135 |
| 4,821,119 | 4/1989 | Gharavi | |
| 4,847,866 | 7/1989 | Jones et al. | 358/136 X |
| 5,038,209 | 8/1991 | Hang | 358/136 |
| 5,072,295 | 12/1991 | Murakami et al. | 358/136 |

FOREIGN PATENT DOCUMENTS

| 0267581 | 5/1988 | European Pat. Off. |
| 3511660 | 10/1986 | Fed. Rep. of Germany |
| 642384 | 1/1989 | Japan |
| 2-241285 | 9/1990 | Japan |

OTHER PUBLICATIONS

Vogel, "Videobild auf der Datenleitung," Funkschau, vol. 26, pp. 60-63, 1988.

Primary Examiner—Victor R. Kostak
Attorney, Agent, or Firm—Stevens, Davis, Miller & Mosher

[57] ABSTRACT

The invention provides a high-efficient coding apparatus for video signal which is intended to control a quantizing step width finely depending on the quality of a inputted image. The coding apparatus is designed to obtain an average value of prediction errors at blocks, each block on which the orthogonal transform is carried out and to define the upper limit of a quantizing step width output from the quantizing step width control circuit depending on the average value. It results in making it possible to finely control the quantizing step width particularly based on each part of the image from a background to a dynamic area.

9 Claims, 3 Drawing Sheets

HIGH-EFFICIENT CODING APPARATUS FOR VIDEO SIGNAL

BACKGROUND OF THE INVENTION

The present invention relates to a high-efficient coding apparatus for a video signal which is used for a TV phone, a video conference, observation, and the like.

For the high-efficient coding apparatus for a video signal, there has been used a motion compensated inter frame prediction which takes the steps of detecting a motion on a screen and correcting the detected motion for performing inter frame prediction and an intra frame prediction which predicts a specific pixel based on other pixels contained in one frame. A conventional high-efficient coding apparatus serves to compute a prediction error by using the prediction having both of the motion compensated inter frame prediction and the intra frame prediction mingled therein, either one of the motion compensated inter frame prediction and the intra frame prediction, or selectively using both of those two predictions, orthogonally translate the prediction error at each block (for example, 8×8) composed of a set of pixels, and code the resulting coefficients. Then, the description will be directed to how the conventional high-efficient coding apparatus is used for transmission.

FIG. 1 shows the conventional high-efficient coding apparatus. As shown, 302 denotes an analog-to-digital converter (referred to as an A/D converter) which is connected to a subtracter 304 through a line 301 and a motion vector detecting circuit 324 through a line 303. The subtracter 304 is connected to a prediction circuit 322 through a line 325 and to an orthogonal transform circuit 306 through a line 305. The orthogonal transform circuit 306 is connected to a coefficient quantizing circuit 308 through a line 307. The coefficient quantizing circuit 308 is connected to a quantized coefficients coding circuit 310 through a line 309 and a quantizing step width control circuit 330 through a line 331. The quantized coefficients coding circuit 310 is connected to a quantized coefficients decoding circuit 312 and a line coding circuit 326 through a line 311. The quantized coefficients coding circuit 312 is connected to a coefficients dequantizing circuit 314 through a line 313. The coefficients dequantizing circuit 314 is connected to an orthogonal inverse transform circuit 316 through a line 315 and to a quantizing step width control circuit 330 through a line 331. The orthogonal transform circuit 316 is connected to an adder 318 through a line 317. The adder 318 is connected to a prediction circuit 322 through a line 325 and to a frame memory 320 through a line 319. The frame memory 320 is connected to the prediction circuit 322 and the motion vector detecting circuit 324 through a line 321. The motion vector detecting circuit 324 is connected to the prediction circuit 322 and the transmission coding circuit 326 through a line 323. The transmission coding circuit 326 is connected to a transmission buffer 328 through a line 327. The transmission buffer 328 is connected to the quantizing step width control circuit 330 through a line 329 and to the outside line through a line 332. The quantizing step width control circuit 330 is connected to the coefficient quantizing circuit 308, the coefficients dequantizing circuit 314, and the transmission coding circuit 326 through a line 331.

Next, the description will be directed to how the foregoing prior art operates. With reference to FIG. 1, an analog video signal is inputted to the A/D converter 302 through the line 301. The A/D converter 302 serves to convert the analog video signal into a digital video signal and send the digital video signal to the subtracter 304 and the motion vector detecting circuit 324 through the line 303. The motion vector detecting circuit 324 serves to detect a motion vector at each block composed of a set of pixels by using the inputted digital video signal and a reproduced pixel value of a frame given before being read from the frame memory 320. The detected motion vector is sent to the prediction circuit 322 and the transmission coding circuit 326 through the line 323.

The prediction circuit 322 serves to use a prediction having the motion compensated inter frame prediction and the intra frame prediction mingled therein, either one of the motion compensated inter frame prediction and the intra frame prediction, or to selectively use both of the predictions for performing the prediction based on the motion vector, the current frame read from the frame memory 320, and (or) the reproduced pixel values of the previous frame. The computed predicted value is inputted to the subtracter 304 and the adder 318 through the line 325. The subtracter 304 serves to compute the prediction error based on the inputted digital video signal. Then, the prediction error is sent to the orthogonal transform circuit 306 which serves to orthogonally transform the prediction error at each block composed of a set of pixels.

Then, the orthogonal transform circuit 306 sends out the orthogonally transformed coefficients to the coefficient quantizing circuit 308. The coefficient quantizing circuit 308 serves to quantize the orthogonally transformed coefficients. The quantizing step width used for quantization is defined in the quantizing step width control circuit 330. The quantizing step width control circuit 330 serves to control the quantizing step width according to the residual information in the transmission buffer 328, that is, control the quantizing step to be longer for suppressing the amount of the information to be generated if the transmission buffer 328 stores a large amount of the residual information and to be smaller for transmitting more fine image if the transmission buffer 328 stores a smaller amount of the residual information.

The quantizing step width is inputted to the transmission coding circuit 326 through the line 331. The transmission coding circuit 326 serves to code the quantizing step and send the result to a decoder. The coefficient quantized in the coefficient quantizing circuit 308 is sent to the quantized coefficients coding circuit 310 in which the quantized coefficients are coded. Then, the coded coefficients are inputted to the transmission coding circuit 326 through the line 311 and to the quantized coefficients decoding circuit 312 in which the code coefficients are locally decoded. Then, the resulting signal is sent to the coefficient dequantizing circuit 314 in which the signal is dequantized. For doing the dequantization, the same width of the dequantizing step as the step width used in the coefficient quantizing circuit 308 is inputted from the quantizing step width control circuit 330 to the coefficient dequantizing circuit 314 through the line 331. Then, the dequantized coefficient is sent to the orthogonal inverse transform circuit 316 in which the dequantized coefficient is inversely transformed for reproducing a prediction error. The predicted value is added to the reproduced prediction error in the adder 318 for the purpose of reproducing the pixel values. The reproduced pixel values are written in the frame memory 320. The information about the motion vector, the information about the orthogonal transform coefficient, and the quantizing step width are inputted to the transmission coding circuit in which these pieces of information are coded for allowing them to be sent on the outer line. Then, the coded signals are inputted to the transmission buffer 328 in which these signals are smoothed in light of speed and then the smoothed signals are sent to the outer line through the line 322.

As has been appreciated from the above description, the high-efficient coding apparatus for video signal is capable of transmitting a moving image with little degradation of image quality according to a constant rate (for example, 64 kb/s, 384 kb/s) or according to a variable rate by controlling the quantizing step width depending on the amount of residual information stored in the transmission buffer 328.

The foregoing conventional high-efficient coding apparatus for video signal is, however, arranged to define a quantizing step width depending on the amount of residual information stored in the transmission buffer 328. That is, the high-efficient coding apparatus serves to control the quantizing step width not depending on the quality of an inputted moving image but the amount of residual information. The conventional coding apparatus is, thus, uncapable of controlling a quantizing step width based on an inputted image so that a background of an inputted image can be finely quantized or the moving part of an inputted image can be finely quantized.

SUMMARY OF THE INVENTION

The present invention is designed to solve the foregoing problems. It is an object of the present invention to provide an excellent high-efficient coding apparatus for video signal which is capable of controlling a quantizing step width finely according to the quality of the inputted image.

In carrying out the object in a preferred mode, the present invention provides a high-efficient coding apparatus for video signal which provides a circuit for defining an upper limit value and a lower limit value of a quantizing step width using a prediction error for a pixel or an average value of two or more prediction errors for the purpose of finely controlling the quantizing step width depending on the quality of an inputted image.

The present invention can produce the following effects in light of the foregoing arrangement. The quality of the inputted image is reflected on a prediction error of a pixel or an average value of prediction errors of two or more pixels. Qualitatively stated, the area with a small prediction error indicates a background area. As the prediction error becomes larger, the area to be indicated is changed as the background area where an object has just moved, the area having no edge in the moving area, and the area having an edge in the moving area in sequence. Hence, there is provided a circuit for defining an upper limit value and a lower limit value of the quantizing step width according to a prediction error or an average value of two or more prediction errors. This circuit serves to finely control the quantizing step width depending on the quality of an inputted image.

DESCRIPTION OF THE PREFERRED EMBODIMENT

Figure 1:
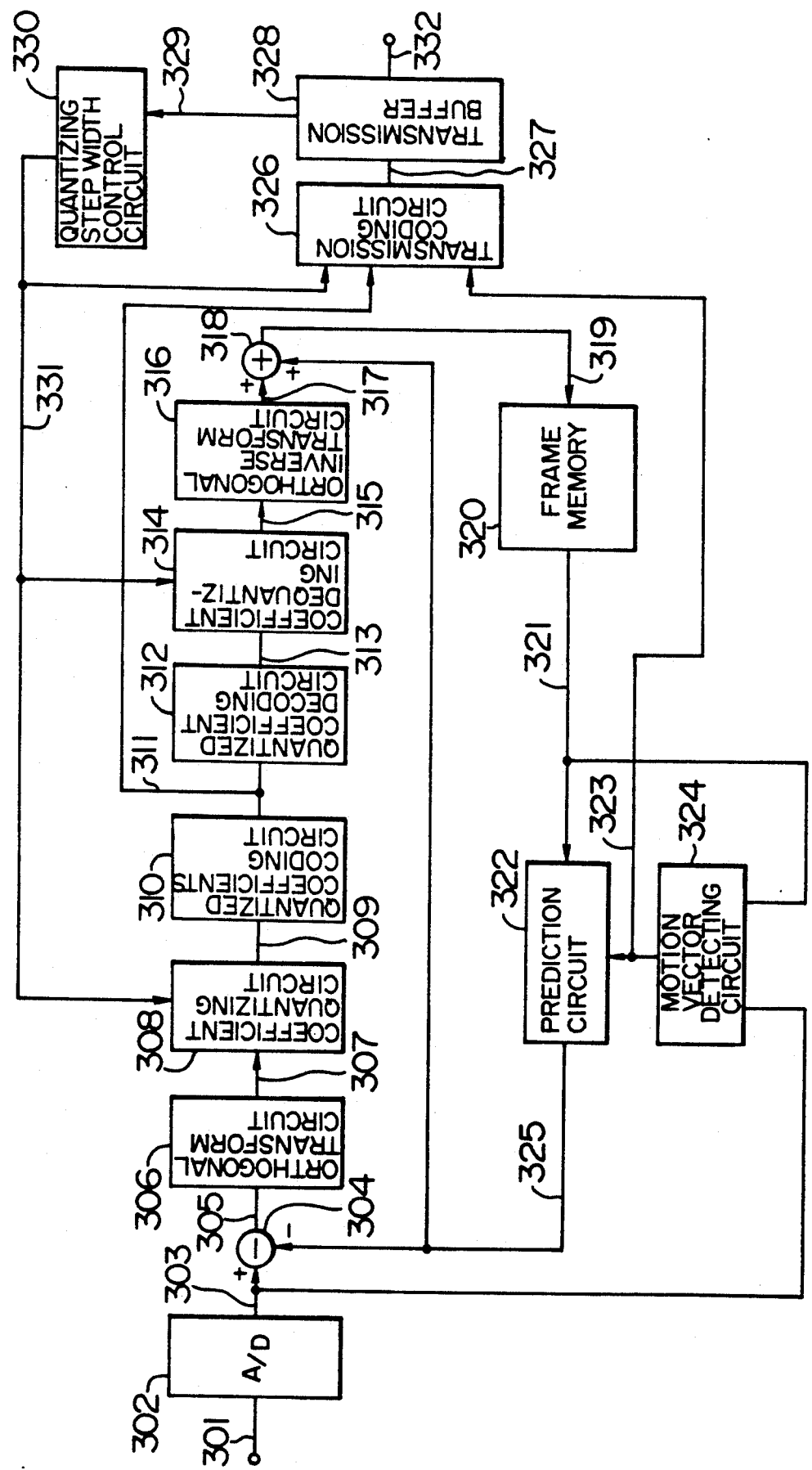
FIG. 1 is a block diagram showing a conventional high-efficient coding apparatus for video signal.
Figure 2:
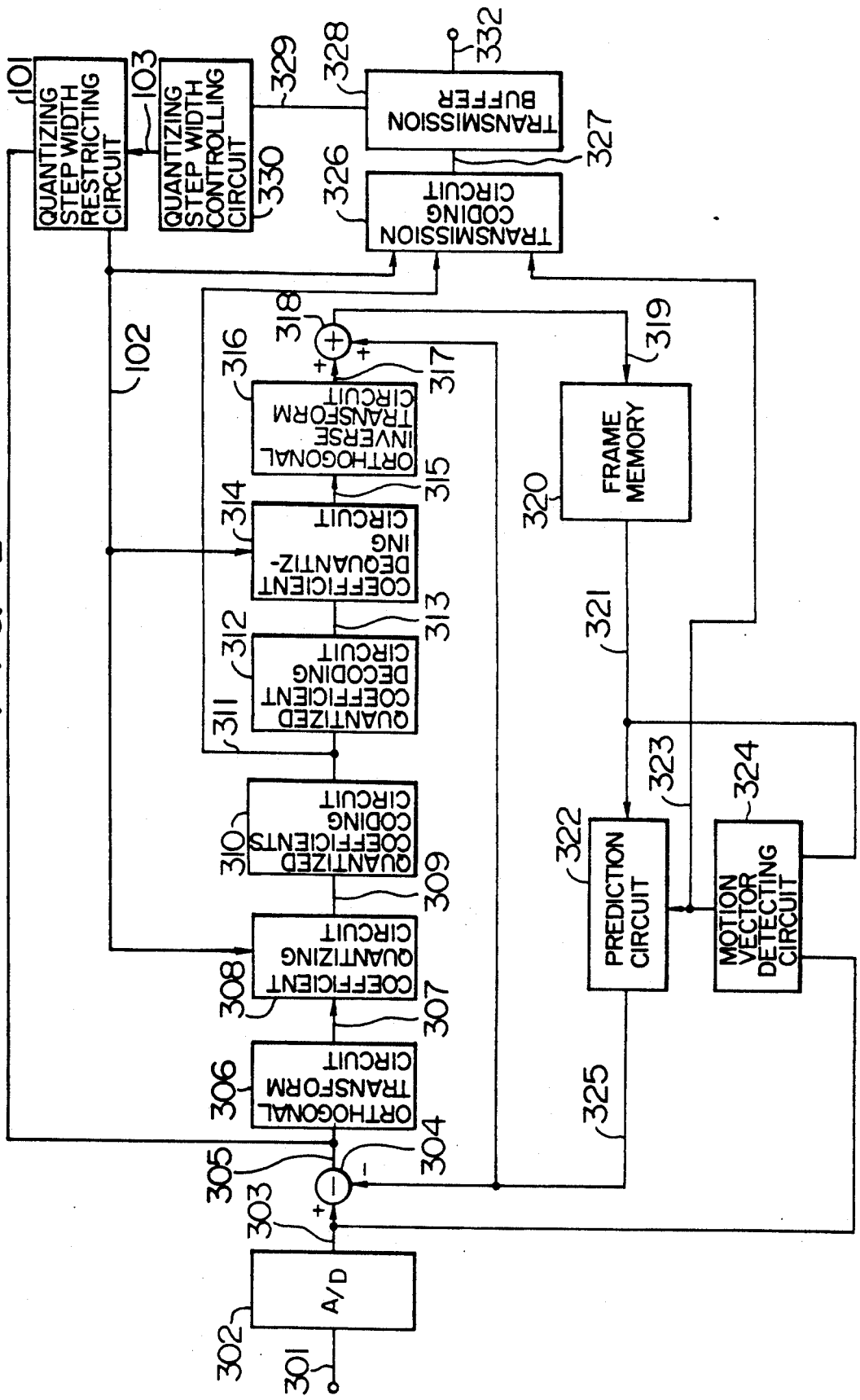
FIG. 2 is a block diagram showing a high-efficient coding apparatus for video signal according to an embodiment of the present invention.

FIG. 2 shows arrangement of an embodiment of the present invention. Some of the components shown in FIG. 2 have the same arrangement and operation as those shown in FIG. 1, which are indicated by the same numbers as those shown in FIG. 1. The following description will be directed to the arrangement and the operation of the different components shown in FIG. 2 from the components shown in FIG. 1. According to this embodiment, the present invention is applied to the transmission. However, the invention may apply to various kinds of applications which employ a compression function of image information.

As shown in FIG. 2, 101 denotes a quantizing step width restricting circuit which is connected to a subtracter 304 through a line 305, a coefficient quantizing circuit 308 through a line 102, and a coefficient reverse quantizing circuit 314 and a line coding circuit 326 through a line 103.

In operation, the quantizing step width restricting circuit 101 serves to define an upper limit value of the quantizing step width output from the quantizing step width control circuit 330 through the line 103. The upper limit value is defined depending on a prediction error inputted from the substrater 304 to the quantizing step width restricting circuit through the line 305. Concretely, the upper limit value is defined depending on an average value of prediction errors at each block (8×8 pixels, for example) or at each set of blocks. The orthogonal transform is carried out on each block. In this case, the following relation is roughly established between the average value of the prediction errors and each part of the screen.

| Average Value of Prediction Values | Small ⟵⟶ large | | | |
|---|---|---|---|---|
| Part of Image | (1) | (2) | (3) | (4) |

(1) Background (still area)
(2) Background where an object has just moved
(3) Moving area having no edge
(4) Moving area having an edge By defining the quantizing step width depending on each average value of the prediction errors, therefore, it is possible to implement control of each quantizing step width based on each part of the screen.

Figure 3:
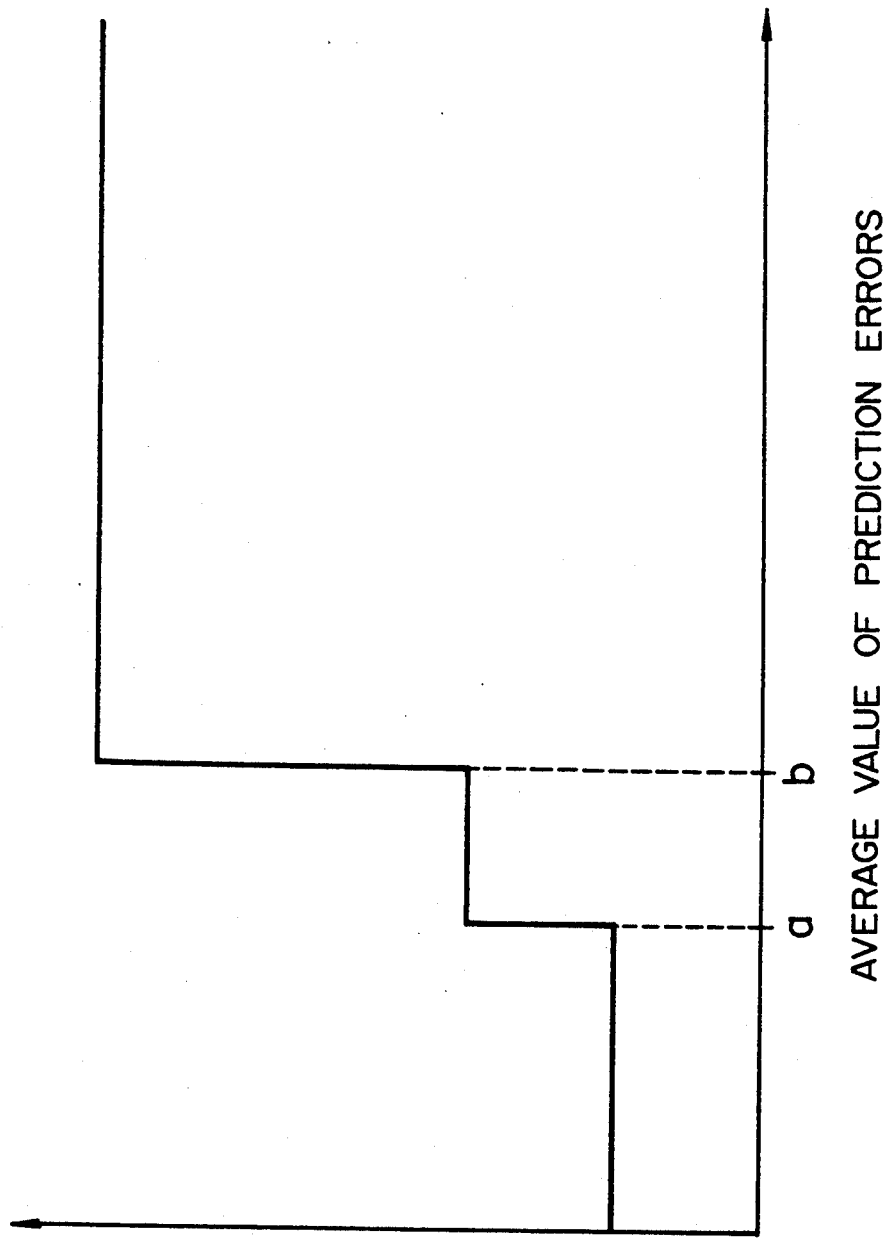
FIG. 3 is a graph for explaining an upper limit value and a lower limit value of a quantizing step value according to the present embodiment.

Herein, the description will be directed to how the quantizing step width is defined especially on the image quality of the background (still area). For focusing the background part, it is necessary to set the upper value of the quantizing step width to small if the small average value of prediction errors is provided. FIG. 3 shows how the upper limit value of the quantizing step width is set in this case. In FIG. 3, a and b have to be defined according to each way of use and object.

According to the foregoing embodiment, as stated above, the upper limit value of the quantizing step width is defined depending on the average value of prediction errors at each block or each set of blocks.

Hence, the present embodiment provides an effect that the quantizing step width can be finely controlled depending on the quality of the inputted image for the purpose of improving an image quality of a specified portion of the inputted image, for example. Further, according to the present embodiment, the upper limit value of the quantizing step value is defined merely by using the average value of the prediction errors. It is, however, possible to use another parameter (for example, a quantizing step width inputted from the quantizing step width control circuit 330 through the line 103 shown in FIG. 2) for more finely specify each part of the image. In addition, the present embodiment has merely described how to set the upper limit value of the quantizing step width. However, it is also possible to set a lower limit value of the quantizing step width for an insignificant part of the image.

What is claimed is:

1. A high-efficient coding apparatus for video signal comprising:

means for performing a prediction function including motion compensated inter frame prediction and intra frame prediction, means for computing a prediction error and orthogonally transforming said prediction error at each block composed of a set of pixels, means for quantizing an orthogonally transformed coefficient by using a predetermined quantizing step width, and means for defining at least one of an upper limit value and a lower limit value of said quantizing step width.

2. A high-efficient coding apparatus for video signal according to claim 1 wherein at least one of the upper limit and the lower limit of the quantizing step width is defined by using a prediction error at each pixel.

3. A high-efficient coding apparatus for video signal according to claim 1 wherein at least one of the upper limit and the lower limit is defined by using an average value of prediction errors at a set of pixels.

4. A high-efficient coding apparatus for video signal comprising:

means for performing at least one of motion compensated inter frame prediction or intra frame prediction, means for computing a prediction error and orthogonally transforming said prediction error at each block composed of a set of pixels, means for quantizing an orthogonally transformed coefficient by using a predetermined quantizing step width, and means for defining at least one of an upper limit value and a lower limit value of said quantizing step width.

5. A high-efficient coding apparatus for video signal according to claim 4 wherein at least one of the upper limit and the lower limit of the quantizing step width is defined by using a prediction error at each pixel.

6. A high-efficient coding apparatus for video signal according to claim 4 wherein at least one of the upper limit and the lower limit is defined by using an average value of prediction errors at a set of pixels.

7. A high-efficient coding apparatus for video signal comprising:

means for performing prediction as selectively switching motion compensated inter frame prediction and intra frame prediction, means for computing a prediction error and orthogonally transforming said prediction error at each block composed of a set of pixels, means for quantizing an orthogonally transformed coefficient by using a predetermined quantizing step width, and means for defining at least one of an upper limit value and a lower limit value of said quantizing step width.

8. A high-efficient coding apparatus for video signal according to claim 7 wherein at least one of the upper limit and the lower limit of the quantizing step width is defined by using a prediction error at each pixel.

9. A high-efficient coding apparatus for video signal according to claim 7 wherein at least one of the upper limit and the lower limit is defined by using an average value of prediction errors at a set of pixels.

* * * * *